United States Patent
Shoji

(10) Patent No.: US 7,403,352 B2
(45) Date of Patent: *Jul. 22, 2008

(54) ACCELERATION SENSOR AND MAGNETIC DISK DRIVE APPARATUS

(75) Inventor: Shigeru Shoji, Chuo-ku (JP)

(73) Assignee: TDK Corporation, Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/483,099

(22) Filed: Jul. 10, 2006

(65) Prior Publication Data

US 2007/0019324 A1    Jan. 25, 2007

(30) Foreign Application Priority Data

Jul. 22, 2005   (JP)   ............................. 2005-212394

(51) Int. Cl.
  *G11B 21/02*   (2006.01)
  *G01P 15/11*   (2006.01)
(52) U.S. Cl. ...................... 360/75; 73/514.31
(58) Field of Classification Search ............. 73/514.31, 73/514.39
  See application file for complete search history.

(56) References Cited

U.S. PATENT DOCUMENTS

| | | | |
|---|---|---|---|
| 6,131,457 A | 10/2000 | Sato | |
| 6,556,007 B1 * | 4/2003 | Abe et al. | 324/252 |
| 6,751,047 B2 * | 6/2004 | Bonin et al. | 360/78.06 |
| 7,222,535 B2 * | 5/2007 | Shoji | 73/514.31 |
| 2006/0101911 A1 | 5/2006 | Shoji | |
| 2007/0186654 A1 * | 8/2007 | Shoji | 73/514.16 |

OTHER PUBLICATIONS

U.S. Appl. No. 11/414,301, filed May 1, 2006.
U.S. Appl. No. 11/482,796, filed Jul. 10, 2006.
U.S. Appl. No. 11/453,090, filed Jun. 15, 2006.
U.S. Appl. No. 11/549,820, filed Oct. 16, 2006.
U.S. Appl. No. 11/549,768, filed Oct. 16, 2006.

* cited by examiner

*Primary Examiner*—K. Wong
(74) *Attorney, Agent, or Firm*—Frommer Lawrence & Haug

(57) ABSTRACT

An acceleration sensor includes a housing member, a spring member attached to the housing member, a magnetic field generation member fixed to the housing member, and at least one magnetic field detection sensor and a weight member, fixed to the spring member so that the at least one magnetic field detection sensor faces the magnetic field generation member. The spring member has freedom in at least one direction of acceleration to be detected. The at least one magnetic field detection sensor is provided with at least one multi-layered MR element including a magnetization fixed layer and a magnetization free layer. A magnetic field is applied to the at least one multi-layered MR element from the magnetic field generation member in a direction substantially perpendicular to a lamination plane of the at least one multi-layered MR element when no acceleration is applied. When an acceleration is applied, the magnetic field is applied to the at least one multi-layered MR element from the magnetic field generation member in a direction changed by an angle corresponding to the applied acceleration from the substantially perpendicular direction.

16 Claims, 9 Drawing Sheets

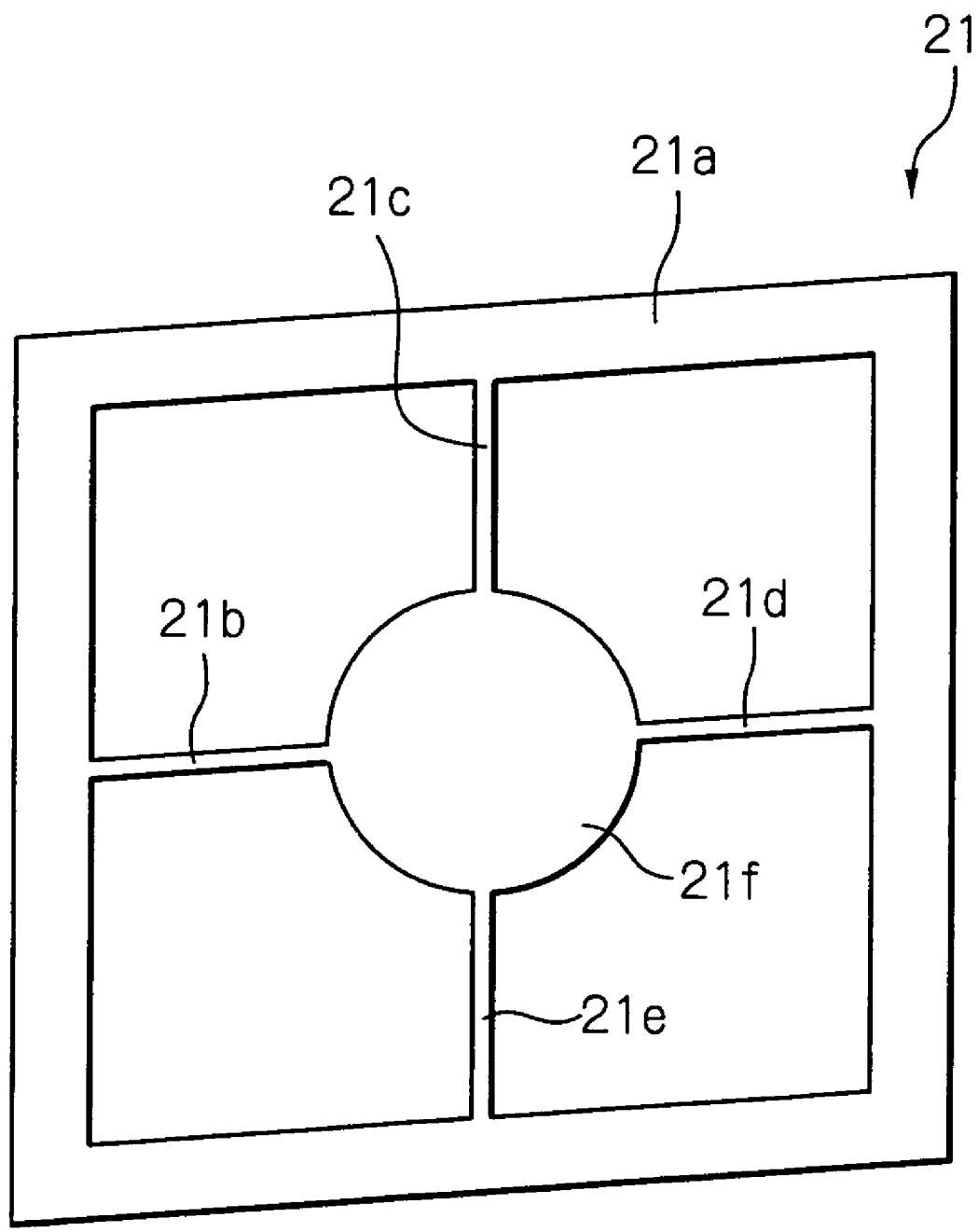

Fig. 6
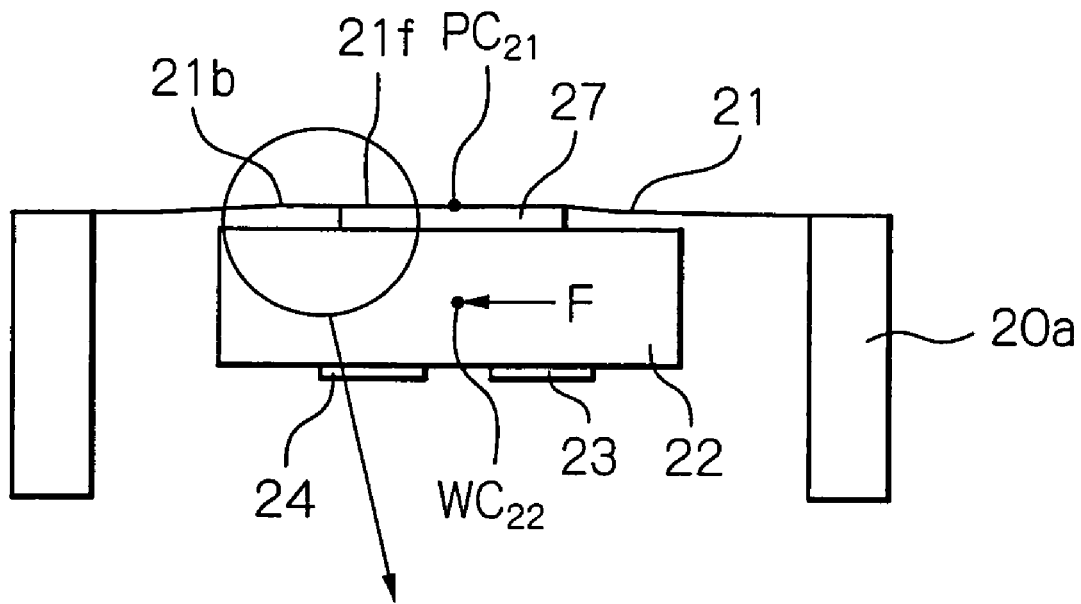
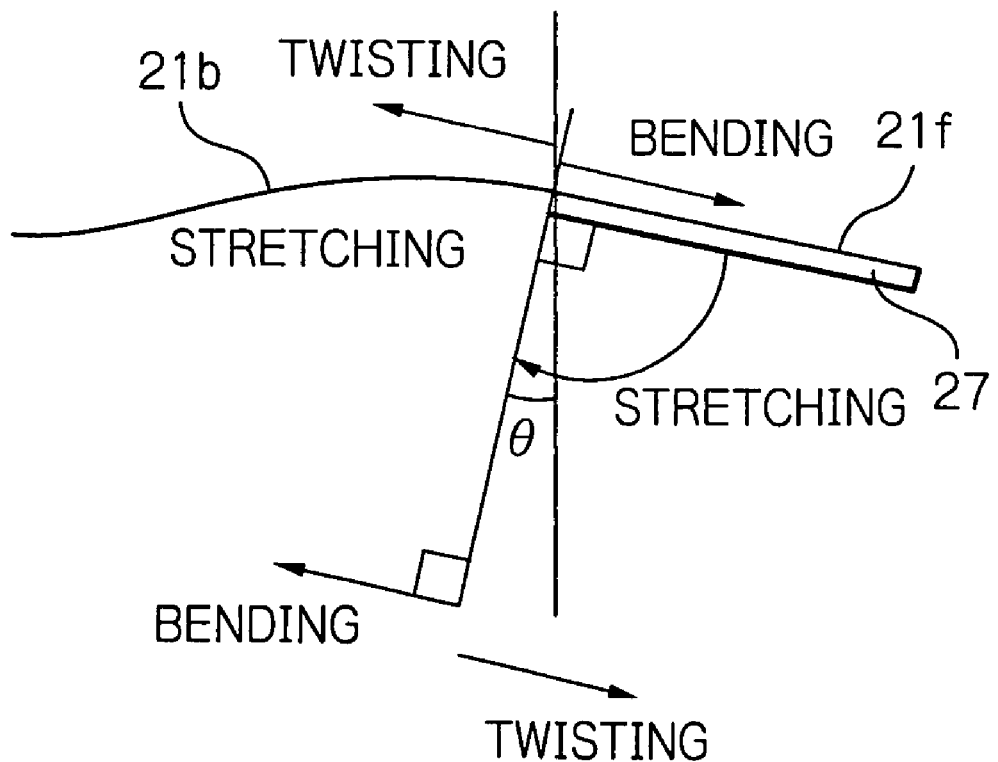

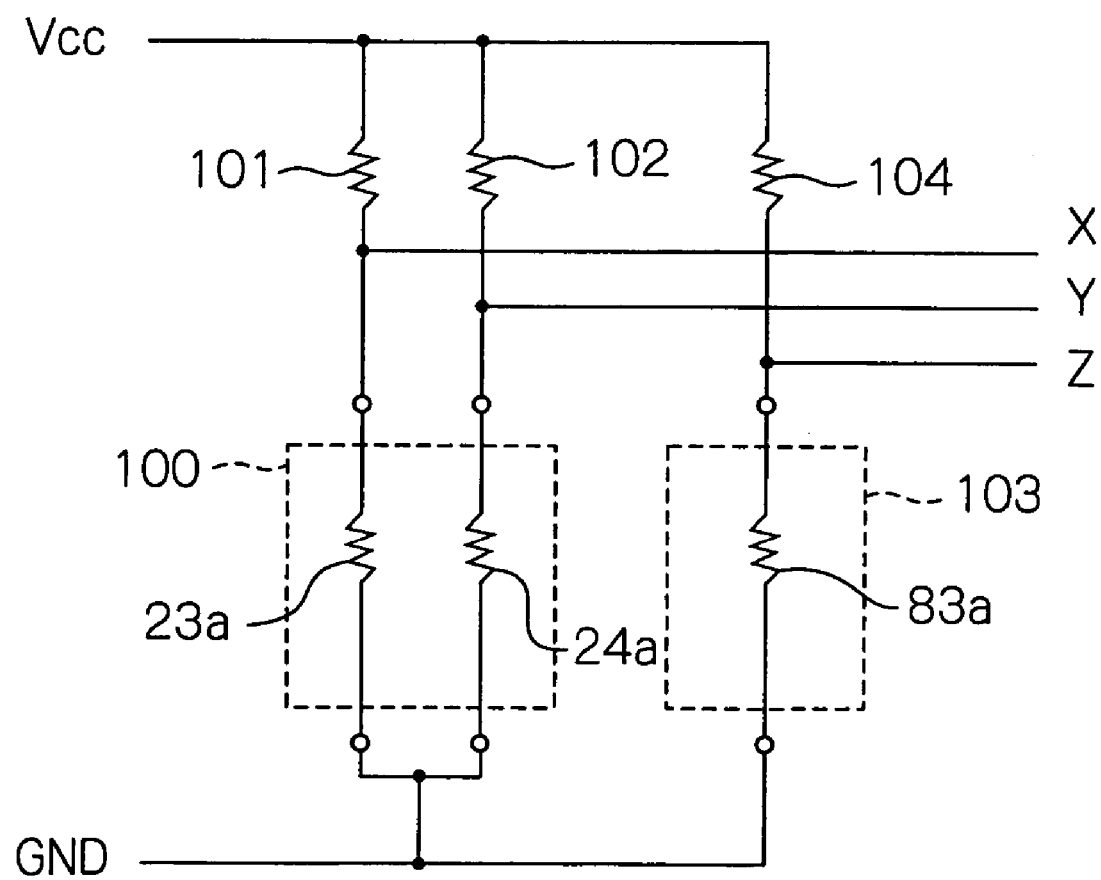

ACCELERATION SENSOR AND MAGNETIC DISK DRIVE APPARATUS

PRIORITY CLAIM

This application claims priority from Japanese patent application No. 2005-212394, filed on Jul. 22, 2005, which is incorporated herein by reference.

BACKGROUND OF THE INVENTION

1. Field of the Invention

The present invention relates to an acceleration sensor with at least one magnetoresistive effect (MR) element and to a magnetic disk drive apparatus with the acceleration sensor.

2. Description of the Related Art

In a magnetic disk drive apparatus or a hard disk drive (HDD) apparatus assembled in a mobile equipment such as for example a walkabout personal computer, a mobile phone, a digital audio player and other mobile gear, an HDD apparatus used as a mobile storage itself or a removable HDD apparatus, in order to prevent a collision of a magnetic head with a hard disk surface due to drop impact, it is necessary to detect the instant at which the HDD apparatus falls before occurrence of the drop impact and to retract the magnetic head from the hard disk surface. Such instant of the falling can be detected from a slight change in the acceleration of gravity.

U.S. Pat. No. 6,131,457 (Japanese patent publication No. 11-352134A) discloses an acceleration sensor for detecting a small change in the acceleration of gravity. This acceleration sensor has a magnetic body including a mass point on an axis along a Z-axis, mounted to a vibrator having three-dimensional freedom, and four or more magnetoresistive effect (MR) detector elements positioned on an X-axis and a Y-axis with their centers located along a perimeter of a concentric circle around the origin point of the orthogonal coordinate axes. The sensor is thus capable of detecting each of acceleration in the direction of X-axis through a relative difference in output voltage between the two detector elements on the X-axis due to a vibration of the magnetic field, acceleration in the direction of Y-axis through a relative difference in output voltage between the two detector elements on the Y-axis due to a vibration of the magnetic field, and acceleration in the direction of the Z-axis through a sum total of the output voltages of all the detector elements.

However, because this known acceleration sensor disclosed in U.S. patent No. 6,131,457 has a structure with the permanent magnet mounted on the vibrator having three-dimensional freedom, this permanent magnet may be moved due to a force produced by an externally applied magnetic field. This movement of the permanent magnet will induce noises or detection errors of acceleration when precise detection of acceleration is performed. Such influence of the externally applied magnetic field will increase in case the acceleration sensor is downsized and thus the size of the permanent magnet decreases.

Also, because the known acceleration sensor uses an anisotropic MR (AMR) element with a single layer structure for each magnetic field detector element causing lower sensitivity of the magnetic field, it is difficult to detect acceleration with high sensitivity.

SUMMARY OF THE INVENTION

It is therefore an object of the present invention to provide an acceleration sensor, whereby highly sensitive and stable acceleration detection can be expected even though having an extremely miniaturized size, and to provide a magnetic disk drive apparatus with the acceleration sensor.

According to the present invention, an acceleration sensor includes a housing member, a spring member attached to the housing member, a magnetic field generation member fixed to the housing member, and at least one magnetic field detection sensor and a weight member, fixed to the spring member so that the at least one magnetic field detection sensor faces the magnetic field generation member. The spring member has freedom in at least one direction of acceleration to be detected. The at least one magnetic field detection sensor is provided with at least one multi-layered MR element including a magnetization fixed layer and a magnetization free layer. A magnetic field is applied to the at least one multi-layered MR element from the magnetic field generation member in a direction substantially perpendicular to a lamination plane of the at least one multi-layered MR element when no acceleration is applied. When an acceleration is applied, the magnetic field is applied to the at least one multi-layered MR element from the magnetic field generation member in a direction changed by an angle corresponding to the applied acceleration from the substantially perpendicular direction.

A bias magnetic field is applied to the lamination plane of the multi-layered MR element fixed to the spring member in a direction substantially perpendicular to the lamination plane of the multi-layered MR element from the magnetic field generation member that is fixed to the housing member. Then, inclination of the multi-layered MR element produced by a balance between a rotation moment due to the applied acceleration and a repulsion due to mainly twisting of the spring member is high sensitively detected as magnetization vector strength in the direction of the magnetization free layer. Particularly, according to the present invention, because the magnetic field generation member is fixed to the housing member, this magnetic field generation member never moves under the influence of external magnetic field even if its size is small. Thus, it is possible to perform precise detection of acceleration. Also, because it is fixed, a large size permanent magnet can be used as the magnetic field generation member to provide strong magnetic bias field to the multi-layered MR element. Thus, this acceleration sensor will be insensitive to possible external electrical field and magnetic field applied thereto, so as to perform precise detection of the acceleration.

Furthermore, because the magnetization vector is detected by the magnetic field detection sensor provided with at least one multi-layered MR element including a magnetization fixed layer and a magnetization free layer, such as for example a giant magnetoresistive effect (GMR) or a tunnel magnetoresistive effect (TMR) element, the amount of and the positive and negative of acceleration in each direction to be detected can be sensed by each magnetic field detection sensor. Therefore, the number of the magnetic field detection sensor can be decreased and also the structure of each magnetic field detection sensor can be extremely simplified resulting the total size of the acceleration sensor to extremely miniaturize. In addition, because the GMR element or TMR element is quite sensitive in magnetic field change, highly sensitive acceleration detection can be expected.

It is preferred that the spring member has freedom in rotation around at least two axes.

It is also preferred that the spring member includes at least two support arm sections capable of twisting and a movable section supported by the at least two support arm sections. The at least one magnetic field detection sensor and the weight member are fixed to the movable section. In this case, more preferably, the at least two support arm sections of the spring member include two support arms running along one axis, and one ends of the two support arms are connected to an outer frame section fixed to the housing member and the other ends of the two support arms are connected to the movable section. In this case, also preferably, the at least two support arm sections of the spring member include four support arms running along two axes perpendicular to each other, and one ends of the four support arms are connected to an outer frame section fixed to the housing member and the other ends of the four support arms are connected to the movable section.

It is preferred that the spring member is arranged in parallel to the lamination plane of the at least one multi-layered MR element, or the spring member is arranged perpendicular to the lamination plane of the at least one multi-layered MR element.

It is also preferred that the weight member is fixed to one surface of the spring member so as to convert acceleration applied thereto into a rotation moment.

It is further preferred that the magnetic field generation member is a permanent magnet.

It is still further preferred that the at least one magnetic field detection sensor is a single magnetic field detection sensor, and that the single magnetic field detection sensor includes at least one multi-layered MR element with the magnetization fixed layer magnetized in a direction parallel to the direction of acceleration to be detected.

It is preferred that the at least one magnetic field detection sensor is a plurality of magnetic field detection sensors, and that each of the plurality of magnetic field detection sensors includes at least one multi-layered MR element with the magnetization fixed layer magnetized in a direction parallel to the direction of acceleration to be detected. In this case, it is more preferred that the magnetization fixed layers of the multi-layered MR elements in one of the plurality of magnetic field detection sensors and in another one of the plurality of magnetic field detection sensors are magnetized in opposite directions with each other. In this case, it is also more preferred that the plurality of magnetic field detection sensors are two magnetic field detection sensors, and that the magnetization fixed layers of the multi-layered MR elements in the two magnetic field detection sensors are magnetized in two directions perpendicular to each other, respectively.

It is also preferred that each magnetic field detection sensor includes a single multi-layered MR element that has a linear section running along a direction perpendicular to a magnetization direction of the magnetization fixed layer in the lamination plane.

It is further preferred that each magnetic field detection sensor includes a plurality of multi-layered MR elements each having a linear section running along a direction perpendicular to a magnetization direction of the magnetization fixed layer in the lamination plane, and that the plurality of multi-layered MR elements are connected with each other in series.

It is preferred that each multi-layered MR element is a GMR element or a TMR element.

According to the present invention, a magnetic disk drive apparatus may include the aforementioned acceleration sensor.

Further objects and advantages of the present invention will be apparent from the following description of the preferred embodiments of the invention as illustrated in the accompanying drawings.

BRIEF DESCRIPTION OF THE DRAWINGS

FIG. 3 is an oblique view illustrating a detail structure of a spring member in the embodiment of FIGS. 2a and 2b;

FIG. 6 is a view illustrating operation of the acceleration sensor in the embodiment of FIGS. 2a and 2b;

FIG. 10 is a circuit diagram illustrating an example of an electrical connection configuration for detecting three-axes accelerations.

DESCRIPTION OF THE PREFERRED EMBODIMENTS

Figure 1:
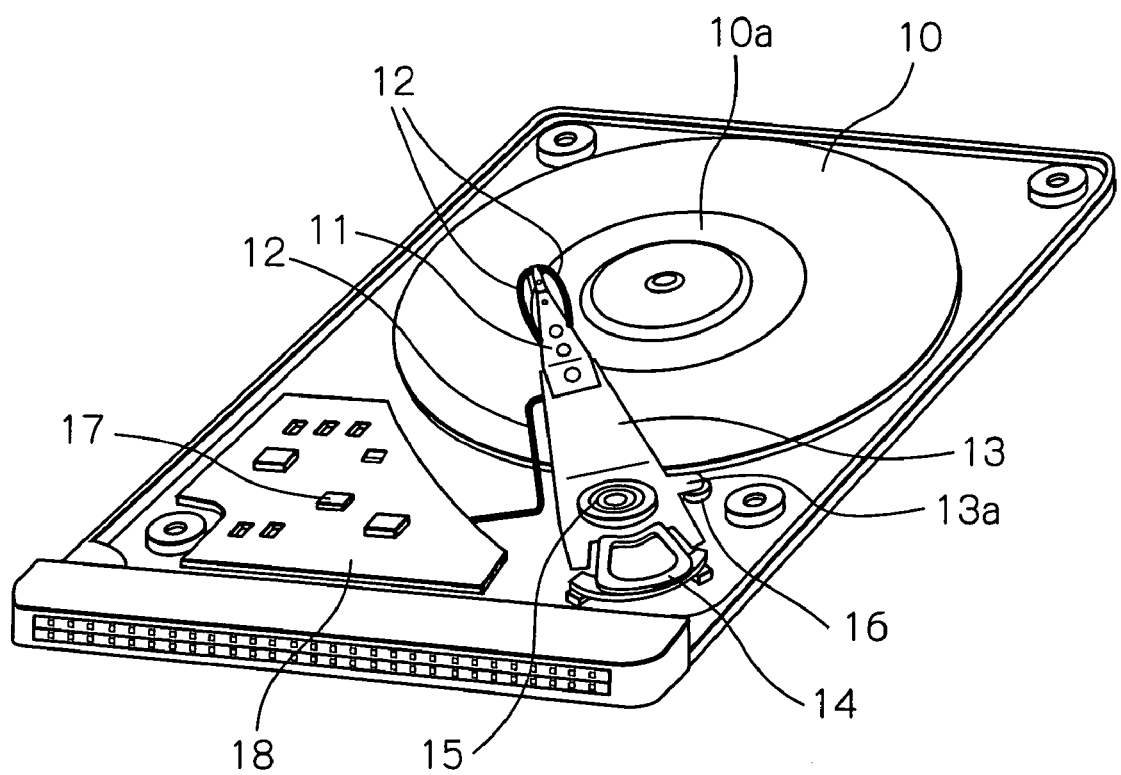
FIG. 1 is an oblique view schematically illustrating a whole structure of an example of a magnetic disk drive apparatus with an acceleration sensor assembled therein.

FIG. 1 schematically illustrates a whole structure of an example of a magnetic disk drive apparatus with an acceleration sensor assembled therein. This magnetic disk drive apparatus is a micro HDD apparatus using at least one magnetic disk of for example 2.5 inches, 1.8 inches, 1.3 inches or 1.0 or less inches. Such micro HDD apparatus may be an HDD apparatus assembled in mobile equipment such as for example a walkabout personal computer, a mobile phone, a digital audio player or other mobile gear, or an HDD apparatus used itself as a mobile storage or a removable HDD.

In the figure that indicates uncovered state of the magnetic disk drive apparatus, reference numeral 10 denotes a magnetic disk rotated by a spindle motor in operation, 10a denotes a retracted zone with no written data into which a magnetic head is moved upon detection of drop, 11 denotes a head gimbal assembly (HGA) provided with the magnetic head that faces to the magnetic disk 10 in operation, at its top end section, 12 denotes a flexible printed circuit (FPC) that is a lead conductor member electrically connected to the magnetic head, 13 denotes a support arm for supporting the HGA 11, 14 denotes a voice coil motor (VCM) that is an actuator for positioning the magnetic head by pivoting the support arm 13 about an axis 15, 16 denotes a ramp on which a tab 13a of the support arm 13 is placed to lift the magnetic disk away from the magnetic disk surface upon detection of drop, and 17 denotes an acceleration sensor mounted on a circuit board 18, respectively.

Figure 2B:
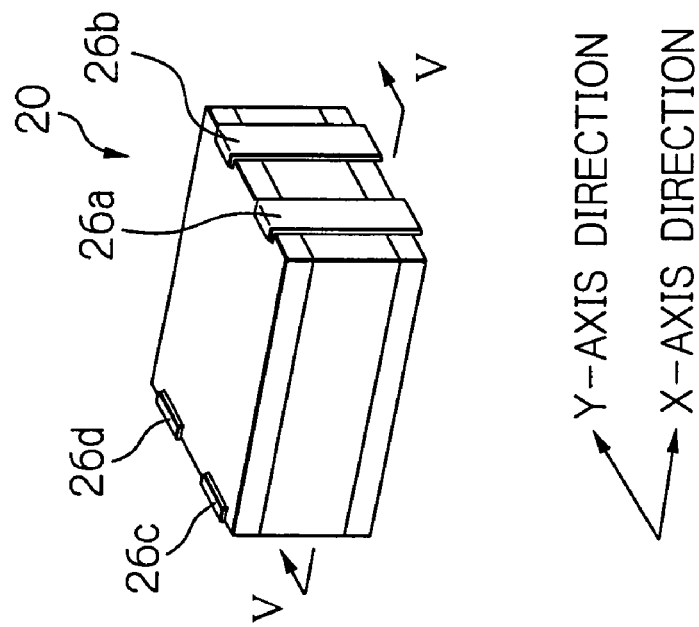
FIGS. 2a and 2b are an exploded oblique view and an oblique view schematically illustrating a whole structure of a preferred embodiment of an acceleration sensor according to the present invention.
Figure 2A:
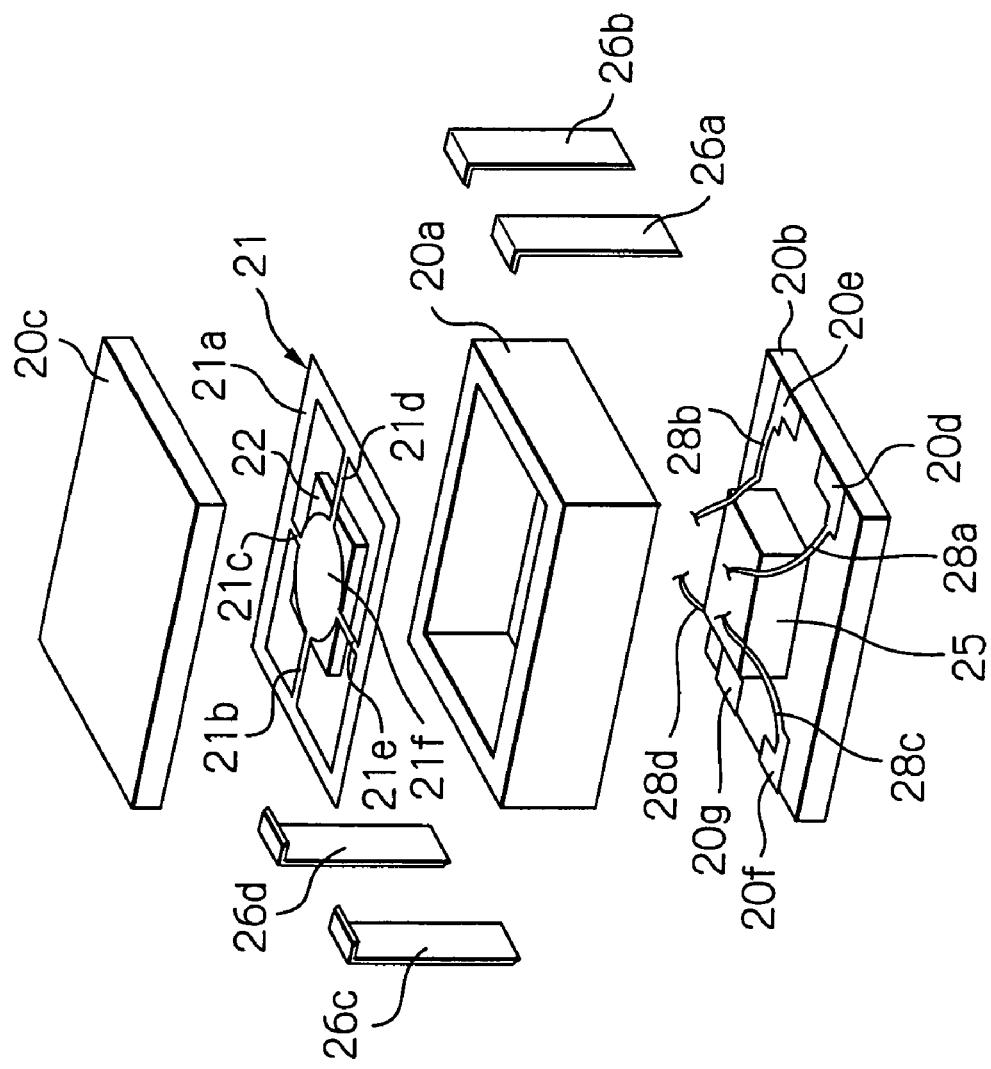
Figure 4:
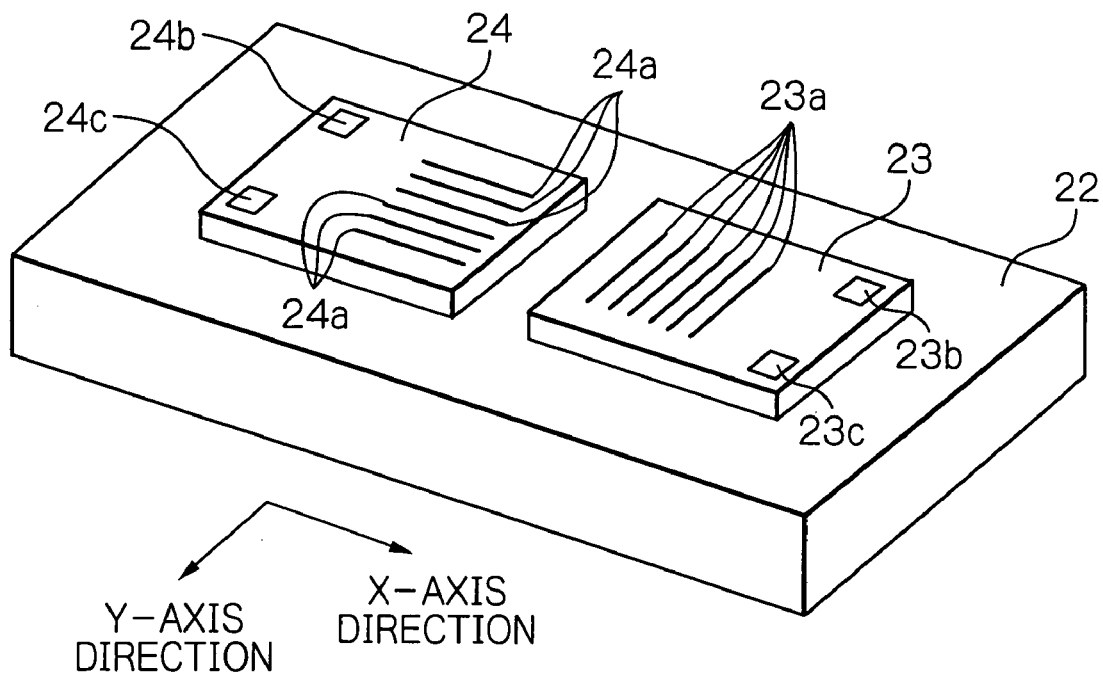
FIG. 4 is an enlarged oblique view, seen from the opposite side of FIG. 2a, illustrating a structure of a weight member and a magnetic field detection sensor in the acceleration sensor in the embodiment of FIGS. 2a and 2b.
Figure 5:
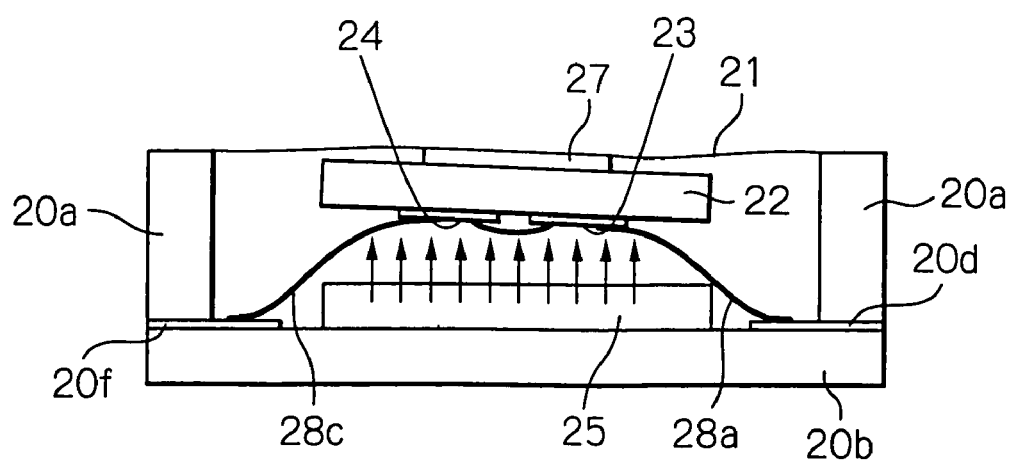
FIG. 5 is a V-V line sectional view of FIG. 2b.

FIGS. 2a and 2b schematically illustrate a whole structure of a preferred embodiment of an acceleration sensor according to the present invention, FIG. 3 illustrates a detail structure of a spring member in this embodiment, FIG. 4 illustrates a structure of a weight member and a magnetic field detection sensor, seen from the opposite side of FIG. 2a, in this embodiment, and FIG. 5 illustrates a V-V line section of FIG. 2b.

As shown in these figures, the acceleration sensor in this embodiment is used for detecting accelerations in both X-axis direction and Y-axis direction and has a spring member 21, a weight member 22, two magnetic field detection sensors 23 and 24, and a permanent magnet 25 used as a magnetic field source, accommodated in a housing member 20.

The housing member 20 has a main body 20a with a rectangular barrel shape, a base 20b with a plane shape and a cover 20c with a plane shape. Both opening of the main body 20a are covered by the base 20b and the cover 20c to seal the housing member 20.

The permanent magnet 25 with a relatively large size, for generating magnetic field is fixed to the base 20b. On the base 20b, also, connection pads 20d, 20e, 20f and 20g are formed. These connection pads 20d, 20e, 20f and 20g are electrically connected respectively to external terminals 26a, 26b, 26c and 26d formed on the outer surfaces of the housing member 20. In this embodiment, the permanent magnet 25 is formed in a rectangular parallelepiped shape. However, the permanent magnet may be formed in a cylindrical shape or other shape in modifications.

The spring member 21 is formed from a thin-film magnetic plate made of for example NiFe, Ni or else, from a thin plate made of for example stainless steel, or from a thin resin plate made of for example polyimide, to have a shape shown in FIG. 3. More concretely, the spring member 21 is formed in a shape with a rectangular outer frame section 21a sandwiched and fixed between the main body 20a and the cover 20c of the housing member 20, four strip-shaped support arm sections 21b, 21c, 21d and 21e that have one ends integrally connected to centers of the respective frame edges of the outer frame section 21a and are capable of twisting, and a movable section 21f located in a center of the spring member 21 and integrally connected to the other ends of the support arm sections 21b, 21c, 21d and 21e. Thus, the spring member 21 constitutes a four-direction stretching spring in which the movable section 21f is stretched in four directions. The support arm sections 21b and 21d and the support arm sections 21c and 21e are running along the X-axis and the Y-axis perpendicular to each other, respectively. In this embodiment, the movable section 21f is shaped in a circle. However, in modifications, the movable section may be formed in a rectangular shape or other shape.

The magnetic field detection sensor 23 for detecting acceleration in the X-axis direction and the magnetic field detection sensor 24 for detecting acceleration in the Y-axis direction are mounted on the movable section 21f of the spring member 21 via the weight member 22 and also a spacer member 27. Terminal electrodes 23b and 23c of the magnetic field detection sensor 23 and terminal electrodes 24b and 24c of the magnetic field detection sensor 24 are wire-bonded to the connection pads 20d, 20e, 20f and 20g formed on the base 20b by gold wires 28a, 28b, 28c and 28d, respectively.

In the magnetic field detection sensor 23 for detecting acceleration in the X-axis direction, a plurality of spin valve GMR elements 23a are formed in parallel with each other. Each spin valve GMR element 23a has a linear section running along a direction (Y-axis direction) perpendicular to the X-axis. These spin valve GMR elements 23a are connected in series with each other and both ends of the serially connected elements are electrically connected to the terminal electrodes 23b and 23c, respectively.

Each spin valve GMR element 23a has a multi-layered structure mainly consisting of a magnetization fixed layer constituted by a pin layer of an anti-ferromagnetic material and a pinned layer of a ferromagnetic material, a nonmagnetic space layer, and a magnetization free layer of a ferromagnetic material. The magnetization of the pinned layer is fixed in a direction perpendicular to a running direction of the free layer. Namely, the magnetization of the magnetic field detection sensor 23 for detecting acceleration in the X-axis direction is fixed in the X-axis direction.

In the magnetic field detection sensor 24 for detecting acceleration in the Y-axis direction, a plurality of spin valve GMR elements 24a are formed in parallel with each other. Each spin valve GMR element 24a has a linear section running along a direction (X-axis direction) perpendicular to the Y-axis. These spin valve GMR elements 24a are connected in series with each other and both ends of the serially connected elements are electrically connected to the terminal electrodes 24b and 24c, respectively.

Each spin valve GMR element 24a has a multi-layered structure mainly consisting of a magnetization fixed layer constituted by a pin layer of an anti-ferromagnetic material and a pinned layer of a ferromagnetic material, a nonmagnetic space layer, and a magnetization free layer of a ferromagnetic material. The magnetization of the pinned layer is fixed in a direction perpendicular to a running direction of the free layer. Namely, the magnetization of the magnetic field detection sensor 24 for detecting acceleration in the Y-axis direction is fixed in the Y-axis direction.

The magnetic field detection sensors 23 and 24 are fixed to the center of one surface of the movable section 21f of the spring member 21 through the weight member 22 so as to face the permanent magnet 25 that is the magnetic field generation member. Thus, the magnetic field from the permanent magnet 25 or the bias magnetic field is applied to the spin valve GMR elements 23a and 24a in a direction perpendicular to their lamination plane when no acceleration is applied.

In this embodiment, the magnetic field detection sensors 23 and 24 have plurality of spin valve GMR elements 23a and 24a, respectively. However, in modifications, each magnetic field detection sensor may have a single spin valve GMR element. In the latter case, each spin valve GMR element may be formed in a serpentine pattern with a plurality of linear sections running along the Y-axis or X-axis direction.

FIG. 6 illustrates operation of the acceleration sensor in this embodiment. Hereinafter, detection of acceleration in the X-axis direction will be described with reference to this figure.

As shown in FIG. 6, the pivot center $PC_{21}$ of the spring member 21 deviates from the center of gravity or weight center $WC_{22}$ of the weight member 22. Thus, when acceleration F in a lateral direction such as in the X-axis direction is applied, this acceleration F is converted to a moment turning about the support arm sections 21c and 21e.

This rotation moment and repulsion due to twisting of the support arm sections 21c and 21e and repulsion due to bending and stretching of the support arm sections 21b and 21d are brought into balance. In this case, the repulsion due to twisting is predominant. As a result, the magnetic field detection sensor 23 is inclined a small angle θ with respect to the X-axis and therefore the direction of the bias magnetic field applied from the permanent magnet 25 changes by the angle θ to the X-axis direction from the perpendicular direction to the lamination plane of the spin valve GMR element 23a.

Because each spin valve GMR element 23a in the magnetic field detection sensor 23 for detecting acceleration in the X-axis direction is magnetized in the X-axis direction, the GMR element extremely sensitively responds to this change in angle θ and abruptly changes its MR resistance.

Figure 7:
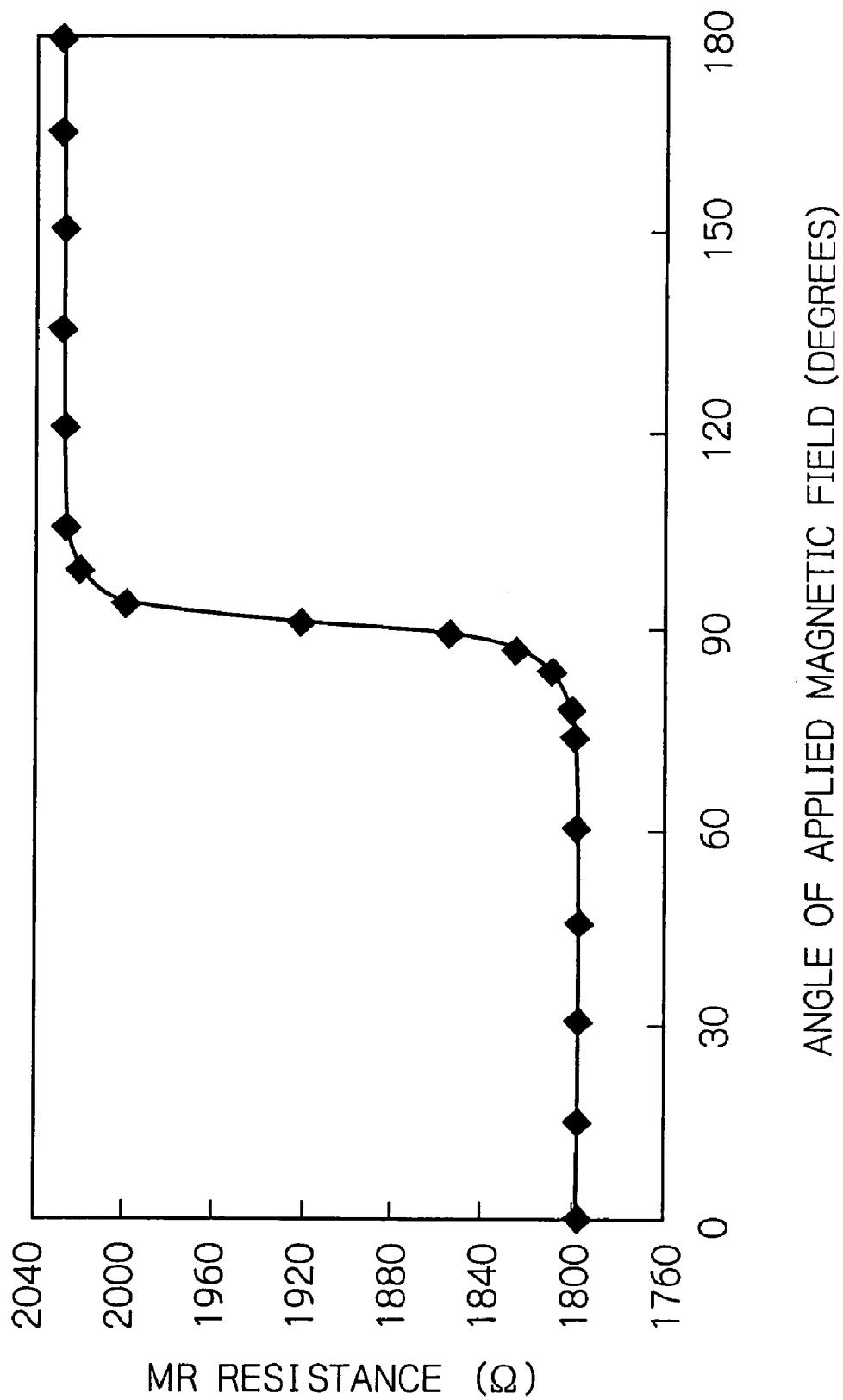
FIG. 7 is a view illustrating characteristics of an MR resistance variation versus an applied magnetic field angle with respect to a lamination plane of a spin valve GMR element.

FIG. 7 illustrates characteristics of the MR resistance variation versus the applied magnetic field angle with respect to the lamination plane of the spin valve GMR element. In the figure, the lateral axis represents an angle (degrees) between the applied magnetic field or the bias magnetic field and the direction along which the free layer runs, that is a direction perpendicular to the magnetization direction, and the longitudinal axis represents an MR resistance (Ω).

As will be noted from the figure, the MR resistance of the spin valve GMR element will greatly change depending upon a slight change near 90 degrees of angle in the bias magnetic field. Because the small angle change θ of the bias magnetic field to the X-axis corresponds to 90 degrees ±θ, the small inclination of the magnetic field detection sensor 23 is extracted as a change in MR resistance. This change in MR resistance indicates not only the amount of angle change but also positive and negative directions of angle change.

Similar to this, detection of acceleration in the Y-axis direction is performed by the magnetic field detection sensor 24.

As the magnetization vector is detected, the amount of and the positive and negative of acceleration in each direction to be detected, that is in each of the X-axis and Y-axis directions, can be sensed by each of the magnetic field detection sensors 23 and 24. Therefore, the number of the magnetic field detection sensors can be decreased and also the structure of each magnetic field detection sensor can be extremely simplified resulting the total size of the acceleration sensor to extremely miniaturize. Furthermore, because the spin valve GMR element is quite sensitive in magnetic field change, highly sensitive acceleration detection can be expected.

According to this embodiment, particularly, because the permanent magnet 25 is fixed to the housing member 20, this permanent magnet 25 never moves under the influence of external magnetic field even if its size is small. Thus, it is possible to perform precise detection of acceleration. Also, because it is fixed, a large size permanent magnet can be used as the permanent magnet 25 to provide strong magnetic bias field to the spin valve GMR elements. Thus, this acceleration sensor will be insensitive to possible external electrical field and magnetic field applied thereto, so as to perform precise detection of the acceleration. In addition, because of a low impedance, the acceleration sensor of this embodiment is relatively unaffected by external disturbance when compared with the piezo-electric type acceleration sensor and the electrostatic capacitance type acceleration sensor.

When a very strong external force is applied to this acceleration sensor, a large stress will be applied to the spring member 21. However, if designed that a space between the spring member 21 and the housing member 20 is narrow as about 0.1 mm for example, this housing member 20 will operate as a limiter to restrict over-stretching of the spring and thus it is possible to prevent cutting or breakage of the spring member.

Although it is merely an example, when forming the spring member 21 by a thin-film plate made of a metal material such as NiFe and Ni, its thickness is about 4 μm, and the width of the support arm sections is about 12 μm. In this case, the inclination θ of the weight member 22 or the magnetic field detection sensors 23 and 24 will be within about 0.2-1.0 degrees, and when an acceleration of 1 G is applied, output signal of several mV can be obtained.

Figure 8:
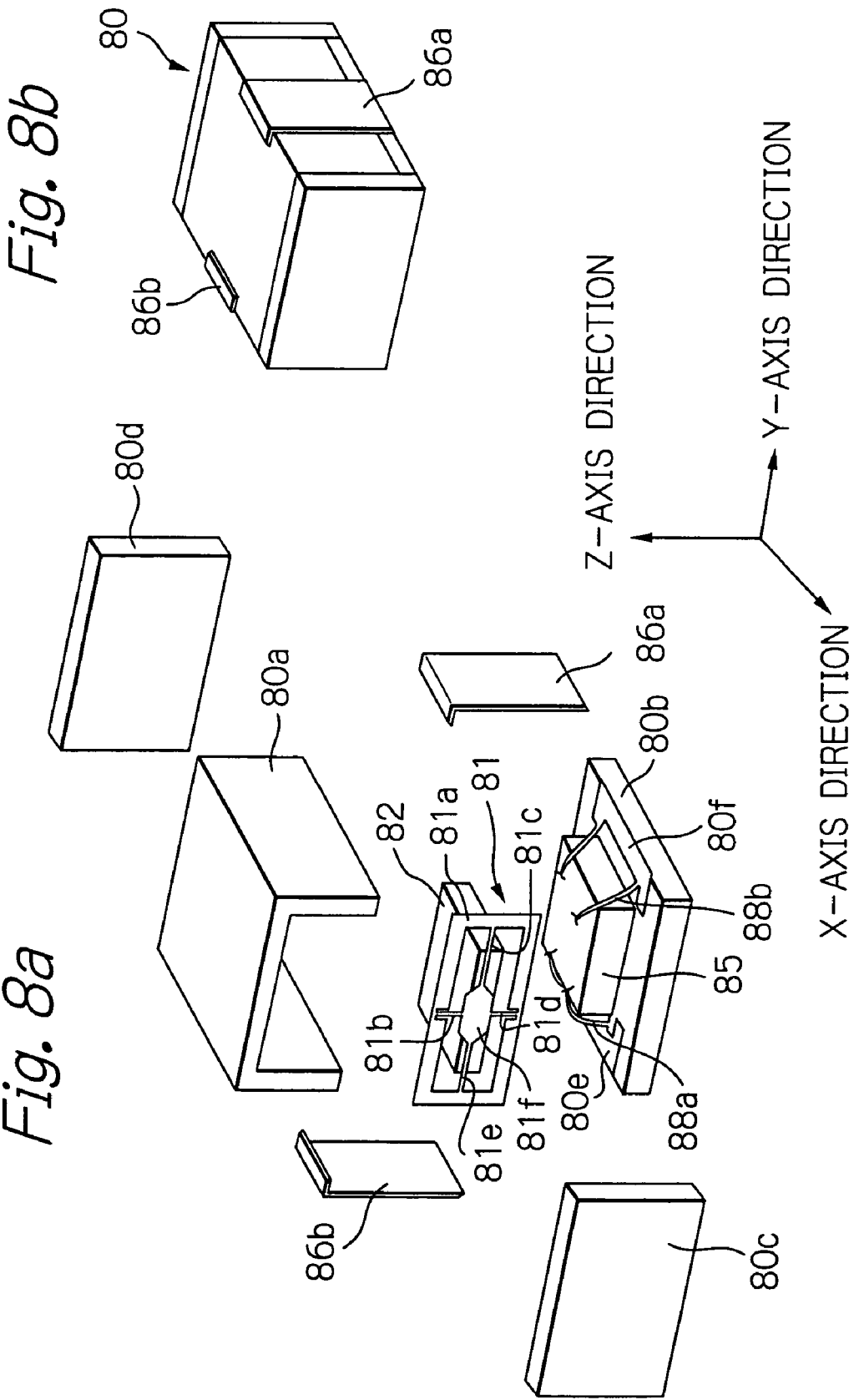
FIGS. 8a and 8b are an exploded oblique view and an oblique view schematically illustrating a whole structure of another embodiment of an acceleration sensor according to the present invention.
Figure 9:
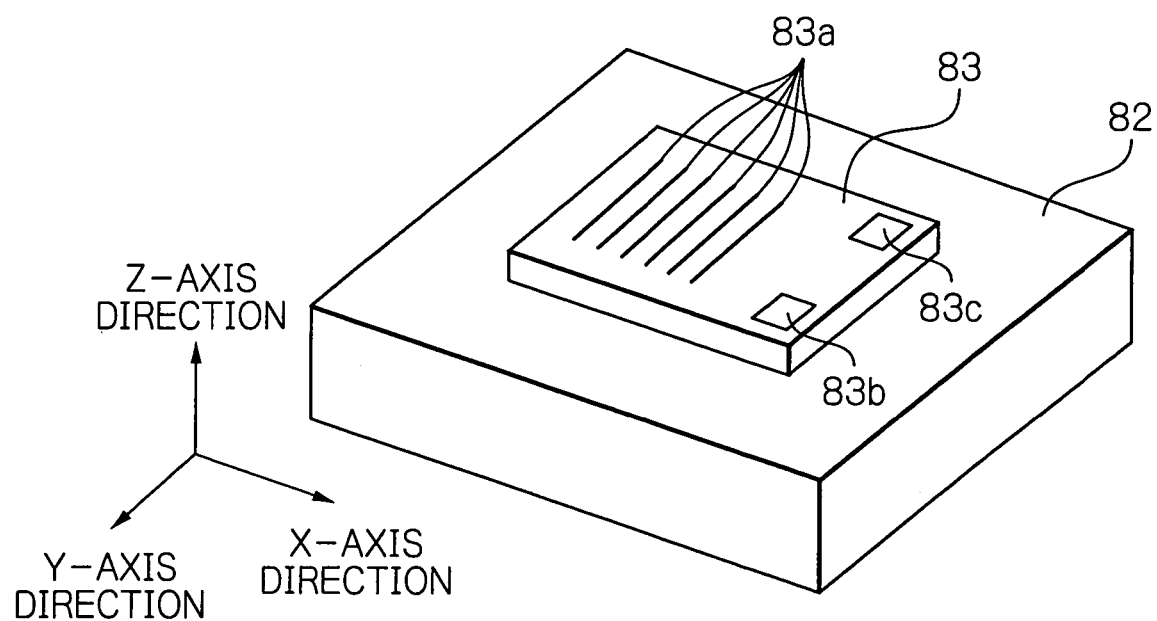
FIG. 9 is an enlarged oblique view, seen from the opposite side of FIG. 8a, illustrating a structure of a weight member and a magnetic field detection sensor in the acceleration sensor in the embodiment of FIGS. 8a and 8b.

FIGS. 8a and 8b schematically illustrate a whole structure of another embodiment of an acceleration sensor according to the present invention, and FIG. 9 illustrates a structure of a weight member and a magnetic field detection sensor, seen from the opposite side of FIG. 8a, in the acceleration sensor in this embodiment.

As shown in these figures, the acceleration sensor in this embodiment is used for detecting acceleration in Z-axis direction and has a spring member 81, a weight member 82, a single magnetic field detection sensor 83 and a permanent magnet 85 used as a magnetic field source, accommodated in a housing member 80.

The housing member 80 has an upper cover 80a with a U-shaped section, a base 80b with a plane shape and side covers 80c and 80d with a plane shape. A bottom opening of the upper cover 80a is covered by the base 80b and side openings of the upper cover 80a are covered by the side covers 80c and 80d to seal the housing member 80.

The permanent magnet 85 with a relatively large size used for generating magnetic field is fixed to the base 80b. On the base 80b, also, connection pads 80e and 80f are formed. These connection pads 80e and 80f are electrically connected respectively to external terminals 86a and 86b formed on the outer surfaces of the housing member 80. In this embodiment, the permanent magnet 85 is formed in a rectangular parallelepiped shape. However, the permanent magnet may be formed in a cylindrical shape or other shape in modifications.

The spring member 81 is formed from a thin-film magnetic plate made of for example NiFe, Ni or else, from a thin plate made of for example stainless steel, or from a thin resin plate made of for example polyimide, to have a shape shown in FIG. 8a. More concretely, the spring member 81 is formed in a shape with a rectangular outer frame section 81a sandwiched and fixed between the main body 80a and the cover 80c of the housing member 80, four strip-shaped support arm sections 81b, 81c, 81d and 81e that have one ends integrally connected to centers of the respective frame edges of the outer frame section 81a and are capable of twisting, and a movable section 81f located in a center of the spring member 81 and integrally connected to the other ends of the support arm sections 81b, 81c, 81d and 81e. Thus, the spring member 81 constitutes a four-direction stretching spring in which the movable section 81f is stretched in four directions. The support arm sections 81b and 81d and the support arm sections 81c and 81e are running along the Z-axis and an axis perpendicular to the Z-axis (along the Y-axis), respectively. The plane of the movable section 81f is perpendicular to the X-axis direction. In this embodiment, the movable section 81f is shaped in a hexagon. However, in modifications, the movable section may be formed in a rectangular shape, a circle shape or other shape.

The magnetic field detection sensor 83 for detecting acceleration in the Z-axis direction is mounted on the movable section 81f of the spring member 81 via the weight member 82 and also a spacer member (not shown). Terminal electrodes 83b and 83c of the magnetic field detection sensor 83 are wire-bonded to the connection pads 80e and 80f formed on the base 80b by gold wires 88a and 88b, respectively.

In the magnetic field detection sensor 83 for detecting acceleration in the Z-axis direction, a plurality of spin valve GMR elements 83a are formed in parallel with each other. Each spin valve GMR element 83a has a linear section running along a direction (Y-axis direction) perpendicular to the X-axis. Thus, the lamination plane of the spin valve GMR elements 83a is perpendicular to the movable section 81f of the spring member 81. These spin valve GMR elements 83a are connected in series with each other and both ends of the serially connected elements are electrically connected to the terminal electrodes 83b and 83c, respectively.

Each spin valve GMR element 83a has a multi-layered structure mainly consisting of a magnetization fixed layer constituted by a pin layer of an anti-ferromagnetic material and a pinned layer of a ferromagnetic material, a nonmagnetic space layer, and a magnetization free layer of a ferromagnetic material. The magnetization of the pinned layer is fixed in a direction perpendicular to a running direction of the free layer. Namely, the magnetization of the magnetic field detection sensor 83 for detecting acceleration in the Z-axis direction is fixed in the X-axis direction.

The magnetic field detection sensors 83 is fixed to the center of one surface of the movable section 81*f* of the spring member 81 through the weight member 82 so as to face the permanent magnet 85 that is the magnetic field generation member. Thus, the magnetic field from the permanent magnet 85 or the bias magnetic field is applied to the spin valve GMR element 83*a* in a direction perpendicular to their lamination plane when no acceleration is applied. In this embodiment, the permanent magnet 85 is formed in a rectangular parallelepiped shape. However, the permanent magnet may be formed in a cylindrical shape or other shape in modifications.

In this embodiment, the magnetic field detection sensor 83 has a plurality of spin valve GMR elements 83*a*. However, in modifications, the magnetic field detection sensor may have a single spin valve GMR element. In the latter case, the spin valve GMR element may be formed in a serpentine pattern with a plurality of linear sections.

As well as in the embodiment shown in FIGS. 2*a* and 2*b*, the center of gravity or weight center of the weight member 82 deviates from the pivot center of the spring member 81. Thus, when acceleration in the Z-axis direction is applied, this acceleration is converted to a moment turning about the support arms 81*c* and 81*e*.

This rotation moment and repulsion due to twisting of the support arm sections 81*c* and 81*e* and repulsion due to bending and stretching of the support arm sections 81*b* and 81*d* are brought into balance. In this case, the repulsion due to twisting is predominant. As a result, the magnetic field detection sensor 83 is inclined a small angle θ with respect to the Z-axis and therefore the direction of the bias magnetic field applied from the permanent magnet 85 changes by this angle θ to the X-axis direction from substantially the perpendicular direction to the lamination plane of the spin valve GMR element 83*a*.

Because the pinned layer of the spin valve GMR element 83*a* in the magnetic field detection sensor 83 for detecting acceleration in the Z-axis direction is magnetized in the X-axis direction in this embodiment, the GMR element extremely sensitively responds to this change in angle θ and abruptly changes its MR resistance. As mentioned in reference to FIG. 7, the MR resistance of the spin valve GMR element will greatly change depending upon a slight change near 90 degrees of angle in the bias magnetic field. Therefore, the small inclination of the magnetic field detection sensor 83 is extracted as a change in MR resistance. This change in MR resistance indicates not only the amount of angle change but also positive and negative directions of angle change.

As a result, the amount of and the positive and negative of acceleration in the Z-axis direction can be detected by this magnetic field detection sensor 83. Therefore, the number of the magnetic field detection sensor can be decreased and also the structure of the magnetic field detection sensor can be extremely simplified resulting the total size of the acceleration sensor to extremely miniaturize. Furthermore, because the spin valve GMR element is quite sensitive in magnetic field change, highly sensitive acceleration detection can be expected.

According to this embodiment, particularly, because the permanent magnet 85 is fixed to the housing member 80, this permanent magnet 85 never moves under the influence of external magnetic field even if its size is small. Thus, it is possible to perform precise detection of acceleration. Also, because it is fixed, a large size permanent magnet can be used as the permanent magnet 85 to provide strong magnetic bias field to the spin valve GMR elements. Thus, this acceleration sensor will be insensitive to possible external electrical field and magnetic field applied thereto, so as to perform precise detection of the acceleration. In addition, because of a low impedance, the acceleration sensor of this embodiment is relatively unaffected by external disturbance when compared with the piezo-electric type acceleration sensor and the electrostatic capacitance type acceleration sensor.

In the aforementioned embodiments, used is a single magnetic field detection sensor magnetized in a direction of acceleration or acceleration component that is to be detected, for example, in the X-axis direction. In modifications, however, a plurality of magnetic field detection sensors magnetized in the same direction may be used. In the latter case, miniaturization in size of the acceleration sensor is somewhat sacrificed. In another modification, two magnetic field detection sensors arranged in parallel, magnetized in the inversed directions, and connected in series may be used to obtain a double differential output.

As for the magnetic field detection element, a TMR element may be used instead of the spin valve GMR element.

In order to detect falling of the magnetic disk drive apparatus, in fact, it is necessary to detect three-axes accelerations. To perform such three-axes acceleration detection, an acceleration sensor as shown in FIGS. 2*a* and 2*b* for detecting accelerations in the X-axis direction and the Y-axis direction and an acceleration sensor as shown in FIGS. 8*a* and 8*b* for detecting acceleration in the Z-axis direction are mounted on the magnetic disk drive apparatus, and the falling is known by calculating both outputs from these acceleration sensors.

FIG. 10 illustrates an example of an electrical connection configuration for detecting the three-axes accelerations.

As shown in the figure, the spin valve GMR element 23*a* of the magnetic field detection sensor 23 for X-axis acceleration detection in the acceleration sensor 100 shown in FIGS. 2*a* and 2*b* and an external resistor 101 are connected in series between the power source Vcc and the ground GND, and the spin valve GMR element 24*a* of the magnetic field detection sensor 24 for Y-axis acceleration detection in this acceleration sensor 100 and an external resistor 102 are connected in series between the power source Vcc and the ground GND. Also, the spin valve GMR element 83*a* of the magnetic field detection sensor 83 for Z-axis acceleration detection in the acceleration sensor 103 shown in FIGS. 8*a* and 8*b* and an external resistor 104 are connected in series between the power source Vcc and the ground GND. Then, an X-axis acceleration detection signal, a Y-axis acceleration detection signal and a Z-axis acceleration detection signal are obtained from the midpoint between the spin valve GMR element 23*a* and the external resistor 101, the midpoint between the spin valve GMR element 24*a* and the external resistor 102 and the midpoint between the spin valve GMR element 83*a* and the external resistor 104, respectively.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An acceleration sensor comprising:
a housing member;
a spring member attached to said housing member, said spring member having freedom in at least one direction of acceleration to be detected;
a magnetic field generation member fixed to said housing member; and
at least one magnetic field detection sensor and a weight member, fixed to said spring member so that said at least one magnetic field detection sensor faces said magnetic field generation member, said at least one magnetic field detection sensor provided with at least one multi-layered magnetoresistive effect element including a magnetization fixed layer and a magnetization free layer,
a magnetic field being applied to said at least one multi-layered magnetoresistive effect element from said magnetic field generation member in a direction substantially perpendicular to a lamination plane of said at least one multi-layered magnetoresistive effect element when no acceleration is applied, and, when an acceleration is applied, the magnetic field being applied to said at least one multi-layered magnetoresistive effect element from said magnetic field generation member in a direction changed by an angle corresponding to the applied acceleration from said substantially perpendicular direction.

2. The acceleration sensor as claimed in claim 1, wherein said spring member has freedom in rotation around at least two axes.

3. The acceleration sensor as claimed in claim 2, wherein said spring member includes at least two support arm sections capable of twisting and a movable section supported by said at least two support arm sections, said at least one magnetic field detection sensor and said weight member being fixed to said movable section.

4. The acceleration sensor as claimed in claim 3, wherein said at least two support arm sections of said spring member include two support arms running along one axis, and wherein one ends of said two support arms are connected to an outer frame section fixed to said housing member and the other ends of said two support arms are connected to said movable section.

5. The acceleration sensor as claimed in claim 3, wherein said at least two support arm sections of said spring member include four support arms running along two axes perpendicular to each other, and wherein one ends of said four support arms are connected to an outer frame section fixed to said housing member and the other ends of said four support arms are connected to said movable section.

6. The acceleration sensor as claimed in claim 1, wherein said spring member is arranged in parallel to the lamination plane of said at least one multi-layered magnetoresistive effect element.

7. The acceleration sensor as claimed in claim 1, wherein said spring member is arranged perpendicular to the lamination plane of said at least one multi-layered magnetoresistive effect element.

8. The acceleration sensor as claimed in claim 1, wherein said weight member is fixed to one surface of said spring member so as to convert acceleration applied thereto into a rotation moment.

9. The acceleration sensor as claimed in claim 1, wherein said magnetic field generation member is a permanent magnet.

10. The acceleration sensor as claimed in claim 1, wherein said at least one magnetic field detection sensor is a single magnetic field detection sensor, and wherein said single magnetic field detection sensor includes at least one multi-layered magnetoresistive effect element with the magnetization fixed layer magnetized in a direction parallel to the direction of acceleration to be detected.

11. The acceleration sensor as claimed in claim 1, wherein said at least one magnetic field detection sensor is a plurality of magnetic field detection sensors, and wherein each of the plurality of magnetic field detection sensors includes at least one multi-layered magnetoresistive effect element with the magnetization fixed layer magnetized in a direction parallel to the direction of acceleration to be detected.

12. The acceleration sensor as claimed in claim 11, wherein the magnetization fixed layers of the multi-layered magnetoresistive effect elements in one of said plurality of magnetic field detection sensors and in another one of said plurality of magnetic field detection sensors are magnetized in opposite directions with each other.

13. The acceleration sensor as claimed in claim 11, wherein the plurality of magnetic field detection sensors are two magnetic field detection sensors, and wherein the magnetization fixed layers of the multi-layered magnetoresistive effect elements in said two magnetic field detection sensors are magnetized in two directions perpendicular to each other, respectively.

14. The acceleration sensor as claimed in claim 1, wherein each magnetic field detection sensor includes a single multi-layered magnetoresistive effect element that has a linear section running along a direction perpendicular to a magnetization direction of said magnetization fixed layer in said lamination plane.

15. The acceleration sensor as claimed in claim 1, wherein each magnetic field detection sensor includes a plurality of multi-layered magnetoresistive effect elements each having a linear section running along a direction perpendicular to a magnetization direction of said magnetization fixed layer in said lamination plane, and wherein the plurality of multi-layered magnetoresistive effect elements are connected with each other in series.

16. The acceleration sensor as claimed in claim 1, wherein each multi-layered magnetoresistive effect element is a giant magnetoresistive effect element or a tunnel magnetoresistive effect element.

* * * * *